G. T. BUCKHAM.
CHUCK.
APPLICATION FILED AUG. 13, 1920.
1,364,704.
Patented Jan. 4, 1921
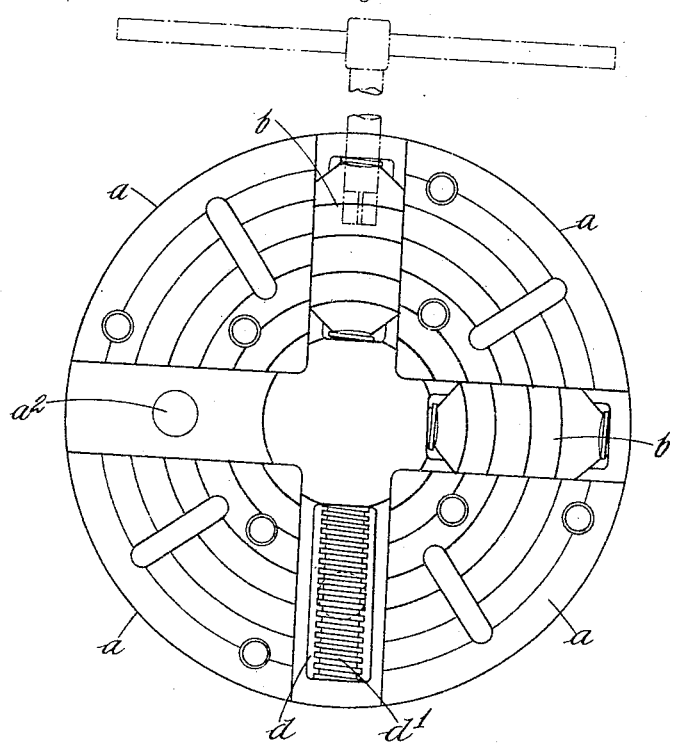
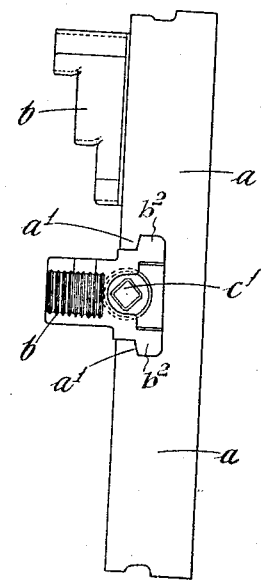
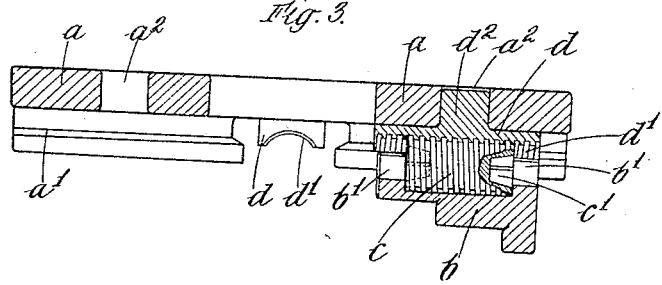
George Thomas Buckham,
Inventor.
Pennie, Davis, Marvin & Edmonds,
Attorneys.

UNITED STATES PATENT OFFICE.

GEORGE THOMAS BUCKHAM, OF WESTMINSTER, LONDON, ENGLAND, ASSIGNOR TO VICKERS LIMITED, OF WESTMINSTER, LONDON, ENGLAND.

CHUCK.

1,364,704.

Specification of Letters Patent. Patented Jan. 4, 1921.

Application filed August 13, 1920. Serial No. 403,304.

*To all whom it may concern:*

Be it known that I, Sir GEORGE THOMAS BUCKHAM, knight, a subject of the King of Great Britain, residing at Vickers House, Broadway, Westminster, in the county of London, England, have invented certain new and useful Improvements in or Relating to Chucks, of which the following is a specification.

This invention relates to chucks of the multiple jaw type wherein the work gripping jaws are mounted radially on a face plate, each jaw being made in two parts of which one constituting the dog, is movable relatively to the other constituting the thrust block, by means of a screw arrangement within each jaw, the chief object of the invention being to improve and simplify the construction of such chucks.

According to the present invention each dog is provided with a rotary screw threaded cylindrical block loosely fitting an unthreaded recess therein so that the thrust on the dogs is taken directly by either end of the screw threaded block which engages with an arcuate threaded surface on the thrust block loosely attached in a stationary position in the face plate of the chuck and held in place by the dog which is adapted to embrace said thrust block and to engage with and slide in grooves or guides in the body of the chuck. These grooves or guides are inclined or beveled for the purpose of obtaining increased strength and the contacting faces of the dogs are correspondingly shaped to afford a satisfactory bearing surface. By these means one pair of grooves or guides serves to retain both the thrust block and the dog on the face plate. The thrust block being in the form of a loose piece may be easily replaced if broken or at all damaged, without having to repair the chuck body itself. The screw threaded block being fitted into the dog, instead of as is usual into the chuck body, enables the depth through the body of the chuck to be reduced by about half the diameter of the screw. The weakest section in all chucks is directly behind the jaw and operating screw and in the present construction the total width of the chuck may be reduced without reducing such section.

In order that the invention may be clearly understood and readily carried into effect the same will now be more fully described with the aid of the accompanying drawing, in which:—

Figure 1 is a front face view of a four-jawed chuck embodying this invention.

Fig. 2 is a side or edge view of the chuck.

Fig. 3 is a sectional plan of Fig. 1.

$a$ is the body or face plate of the chuck formed with the inclined or beveled grooves or guides $a'$. $b$, $b$ are the dogs, $c$, $c$ are the screw-threaded adjusting blocks and $d$, $d$ are the thrust blocks each formed with an arcuate thread $d'$ (Figs. 1 and 3) for engaging its respective screw threaded adjusting blocks $c$. Each of the said screw threaded adjusting blocks $c$ is shown of a length approximately two-thirds the length of the dog $b$ which is provided with an unthreaded recess or channel to loosely receive the screw threaded block $c$. Each extremity of the screw threaded adjusting blocks $c$ is provided with a rectangular opening or socket $c'$ for receiving the tool or key used for actuating the screw threaded blocks, the extremities of the dogs $b$ being also provided with recesses or channels $b'$ co-axial with sockets $c'$ to allow the said tool or key to be inserted into the sockets $c'$. The thrust blocks $d$ are provided with stalks or stems $d^2$ loosely fitting in openings $a^2$ in the face plate $a$, and said thrust blocks are retained in place by side flanges $b^2$ on the dogs embracing the thrust blocks and shaped to engage with the beveled groves $a'$ in the face plate. The arcuate threaded surface $d'$ of the thrust blocks is of a length exceeding the length of the screw threaded adjusting blocks $c$ over which said arcuate threaded surface $d'$ fits saddle fashion, the threads of the screw threaded adjusting block $c$ coöperating with the threads $d'$ to impart motion to the dogs when said screw threaded blocks are actuated.

What I claim is:

1. In a chuck the combination with the face plate of a plurality of work-gripping jaws each comprising a thrust block and a radially displaceable dog having an unthreaded recess, a screw threaded rotary cylindrical block loosely fitting said unthreaded recess in the dog, arcuate screw threads on the thrust block with which said screw threaded block engages, means for revolving said screw threaded block to adjust the position of the dog radially on the face plate, means for loosely attaching said thrust block in a stationary position on the face plate and means forming part of said dog for retaining both the thrust block and the dog on the face plate.

2. In a chuck the combination with the face plate of a plurality of work-gripping jaws each comprising a thrust block and a radially displaceable dog having an unthreaded recess, a screw threaded rotary cylindrical block loosely fitting said unthreaded recess in the dog, arcuate screw threads on the thrust block with which said screw threaded block engages, means for revolving said screw threaded block to adjust the position of the dog radially on the face plate, means for loosely attaching said thrust block in a stationary position on the face plate and side flanges on said dog embracing the thrust block, said face plate having beveled grooves in which said flanges fit.

3. In a chuck the combination with the face plate of a plurality of work-gripping jaws each comprising a thrust block and a radially displaceable dog having an unthreaded recess, a screw threaded rotary cylindrical block loosely fitting said unthreaded recess in the dog, arcuate screw threads on the thrust block with which said screw threaded block engages, means for revolving said screw threaded block to adjust the position of the dog radially on the face plate, a stem on said thrust block, the face plate having a corresponding opening in which said stem loosely fits, and side flanges on said dog embracing the thrust block, said face plate having beveled grooves in which said flanges fit.

4. In a chuck, the combination with the face plate of a plurality of work-gripping jaws each comprising a thrust block and a radially displaceable dog having an unthreaded recess, a screw threaded rotary cylindrical block loosely fitting said unthreaded recess in the dog, arcuate screw threads on the thrust block with which said screw threaded block engages, said screw threaded block having end sockets for the reception of an actuating key for revolving said screw threaded block and said dog having recesses coaxial with said sockets, a stem on said thrust block loosely fitting a corresponding opening in the face plate and side flanges on said dog embracing the thrust block, said face plate having beveled grooves in which said flanges fit.

In testimony whereof I affix my signature.

GEORGE THOMAS BUCKHAM.